United States Patent
Crawford et al.

[11] Patent Number: 6,081,415
[45] Date of Patent: Jun. 27, 2000

[54] APPARATUS FOR A CRATER-STYLE CAPACITOR FOR HIGH-VOLTAGE

[75] Inventors: Robert K. Crawford, Palo Alto; J Gerson Goldberg, Mountain View, both of Calif.

[73] Assignee: Agilent Technologies, Inc., Palo Alto, Calif.

[21] Appl. No.: 09/181,409

[22] Filed: Oct. 28, 1998

[51] Int. Cl.⁷ .............................. H01G 4/005; H01G 4/00
[52] U.S. Cl. ........................ 361/303; 361/329; 361/301.3
[58] Field of Search .................. 361/301.3, 303, 361/304, 309, 311–313, 329, 273

[56] References Cited

U.S. PATENT DOCUMENTS

| | | | |
|---|---|---|---|
| 1,797,878 | 3/1931 | Palm et al. | 361/329 |
| 1,892,375 | 12/1932 | Bailey | 361/311 |
| 1,937,010 | 11/1933 | Dubilier et al. | 361/311 |
| 1,965,007 | 7/1934 | Smith | 361/312 |
| 2,159,793 | 5/1939 | Grundmann | 361/303 |
| 2,436,208 | 2/1948 | Dressel | 361/303 |
| 2,569,655 | 10/1951 | Cage | 361/313 |
| 4,312,023 | 1/1982 | Frappart et al. | 361/243 |
| 4,466,047 | 8/1984 | Avocat | 361/303 |
| 5,335,138 | 8/1994 | Sandhu et al. | 361/303 |
| 5,392,019 | 2/1995 | Ohkubo | 336/200 |
| 5,412,358 | 5/1995 | Hirai et al. | 333/204 |
| 5,576,672 | 11/1996 | Hirai et al. | 333/204 |

FOREIGN PATENT DOCUMENTS

| | | | |
|---|---|---|---|
| 0 171 131 | 3/1985 | European Pat. Off. | H01L 27/10 |
| 0 230 415 | 10/1985 | European Pat. Off. | G01V 1/157 |
| 0 313 439 | 10/1988 | European Pat. Off. | H01G 4/38 |
| 60-223153 | 11/1985 | Japan . | |

*Primary Examiner*—Dean A. Reichard
*Assistant Examiner*—Anthony Dinkins
*Attorney, Agent, or Firm*—Trueman H. Denny, III

[57] ABSTRACT

The invention relates to an apparatus for a crater-style sampling capacitor. The apparatus includes a dielectric having a smooth crater shaped input electrode on a first surface and output and guard electrodes on a second surface. A sampling capacitor is defined by the input and output electrodes, and a guard capacitor is defined by the input and guard electrodes. The edge of input electrode is positioned below the first surface to increase surface flash over voltage, further, the input electrode is curved to eliminate corona discharge at edges of the input electrode and to reduce self-heating to negligible levels. The apparatus is suitable for high-voltage radio-frequency applications, such as a mass spectrometer, or other high-voltage applications that require an accurate sampling capacitor for amplitude control and accurate sampling of radio-frequency waveforms.

9 Claims, 8 Drawing Sheets

APPARATUS FOR A CRATER-STYLE CAPACITOR FOR HIGH-VOLTAGE

BACKGROUND OF THE INVENTION

The present invention relates generally to electrical capacitors and particularly to a crater-style capacitor for high-voltage radio-frequency applications.

Many applications require the sampling and control of high-voltage waveforms, particularly waveforms at radio frequencies. A sampling capacitor may be used to sample the waveform as feedback to control the amplitude of the waveform. To provide accurate sampling and amplitude control, the sampling capacitor must have a stable capacitance value. Further, it is often desirable to provide a guard capacitor positioned concentrically outward of the sampling capacitor. The guard capacitor protects the sampling capacitor from the effects of fringing fields and allows for accurate amplitude control based on the capacitance of the sampling capacitor only.

Desirable attributes of a sampling capacitor include negligible self-heating between the capacitor electrode and dielectric and elimination of corona discharge at the electrode edges. Self-heating of the capacitor can result in damage to the capacitor dielectric, and as the capacitor temperature rises it becomes more difficult to compensate for changes in capacitance due to the heating of the dielectric. Corona discharge at the edges of the electrodes can destroy the capacitor, damage the dielectric, or start a fire.

The crater-style capacitor of the present invention eliminates corona discharge at the electrode edges and has negligible self-heating. A system incorporating the capacitor can easily be compensated for stability. The capacitor includes two concentric capacitors patterned onto a dielectric such as quartz or ceramic. The outer guard capacitor protects an inner sampling capacitor from fringing fields. Amplitude feedback to a control system incorporating the capacitor is provided by the sampling capacitor only. In some applications, the combined capacitance of the guard capacitance and the sampling capacitance can be used in a resonant RF tank circuit.

Previous designs for sampling capacitors include ceramic-gap capacitors, open-gap capacitors, capacitors having a planar upper electrode, capacitors with an encapsulated upper planar electrode, and capacitors with a half-dome input connector to cover the upper planar electrode in combination with encapsulation of the upper planar electrode.

The disadvantage of ceramic-gap capacitors is that having ceramic in the gap yields a large spread of temperature coefficients and capacitance values. Ceramic is a variable blend with properties that vary from batch to batch of ceramic material.

Open gap capacitors are very large and suffer from voltage range limitations caused by corona discharge at planar electrode edges. Mechanical spacers used in the open-gap capacitor have varying temperature coefficients that alter the capacitance values. The dielectric constant of an open-gap capacitor is affected by humidity unless the capacitor is placed in a vacuum or other controlled environment.

In FIG. 1, there is provided for purposes of illustration, a prior art sampling capacitor generally designated as 100. The sampling capacitor 100 has a dielectric 103 with an upper planar electrode 115 and a lower planar electrode 119 positioned on opposing surfaces of the dielectric 103. Additionally, guard electrode 121, completely encircles the lower planar electrode 119. A sampling capacitor is defined by the upper planar electrode 115 and the lower planar electrode 119 and a guard capacitor is defined by upper planar electrode 115 and the guard electrode 121. An electrode gap 135 electrically isolates the guard electrode 121 from the lower planar electrode 119. One disadvantage of sampling capacitor 100 is that corona discharge occurs at an upper edge acuity 116 of the upper planar electrode 115 at operating voltages above about 2.5 kilovolts. In one experiment, encapsulating the upper planar electrode 115 with an encapsulant 125 extends the operating voltage to about 8.0 kilovolts; however, self-heating occurs at about 8.0 kilovolts. Further, as illustrated in FIG. 3, at operating voltages near about 12.0 kilovolts, an intense voltage gradient 118 at the upper edge acuity 116 create a corona discharge (hot spot) that ignited the encapsulant 125.

FIG. 2 illustrates another prior art sampling capacitor generally designated as 200. The sampling capacitor 200 employs a half-dome button 224 to overcome the intense voltage gradient at an upper edge acuity 216 of an upper planar electrode 215. The half-dome button 224 eliminates the self-heating and corona discharge problems of the sampling capacitor 100; however, penetration of encapsulant 225 between the half-dome button 224, as illustrated by arrow 227, results in a button-to-ground capacitance through both the encapsulant 225 and dielectric 203. Because the button-to-lower electrode capacitances do not manifest themselves totally through just the dielectric 203, the composition and temperature coefficient of the sampling capacitor varies. Therefore, the sampling capacitor 200 yields a high-voltage capacitor, but with the value of the sampling capacitor compromised by the button-to-ground capacitance.

From the foregoing it will be apparent that there is a need for a sampling capacitor that can withstand high-voltages, produces negligible self-heating, eliminates corona discharge, reduces the encapsulant's contribution to the sampling capacitor, and allows for a system incorporating the sampling capacitor to compensate for system stability.

SUMMARY OF THE INVENTION

The present invention provides a crater-style capacitor for high-voltage radio-frequency applications or other applications that require a stable sampling capacitor. The apparatus includes a dielectric having a crater in a first surface of the dielectric. An electrically conductive input electrode is deposited in the crater. An output electrode is positioned on a second surface of the dielectric creating a sampling capacitor between the input and the output electrodes. A guard electrode is positioned concentrically outward of the output electrode and defines a guard capacitor between the input and the guard electrodes.

An apparatus embodying the invention provides a stable sampling capacitor, eliminates corona discharge, has negligible self-heating, and allows a system incorporating the present invention to be compensated for system stability while withstanding high-voltages in excess of 17.0 kilovolts.

In a preferred embodiment, a slab of dielectric material has a crater formed in a first surface. The crater having a smooth surface defined by a bottom surface, a liftoff curve, and a sidewall surface. An output electrode and a guard electrode are deposited on an opposing surface, with the guard electrode encircling the output electrode. An input electrode is deposited in the crater and covers the bottom, the liftoff curve, and a portion of the sidewall surface. An edge of the input electrode is positioned on the sidewall surface at a point intermediate between the first surface and the sidewall surface. Input and output terminals are connected to the input and output electrodes respectively. The crater is filled with a non-conductive encapsulant. The resulting crater-style capacitor includes a sampling capacitor defined by the input electrode and the output electrode and a guard capacitor defined by the input electrode and the guard electrode. In another embodiment, the edge of the input electrode positioned at a point on the sidewall surface adjacent to the first surface. Additionally, the crater-style capacitor may be mounted in a base for thermal control and/or monitoring.

A method of making a crater-style capacitor according to the present invention may include the following steps: grinding a crater into a first surface of a dielectric, depositing an input electrode in the crater, applying an output electrode on a second surface of the dielectric, and applying a guard electrode on the second surface. Optional steps may include attaching an input connector to the input electrode, attaching an output connector to the output electrode, and filling the crater with an encapsulant.

DETAILED DESCRIPTION

Figure 1:
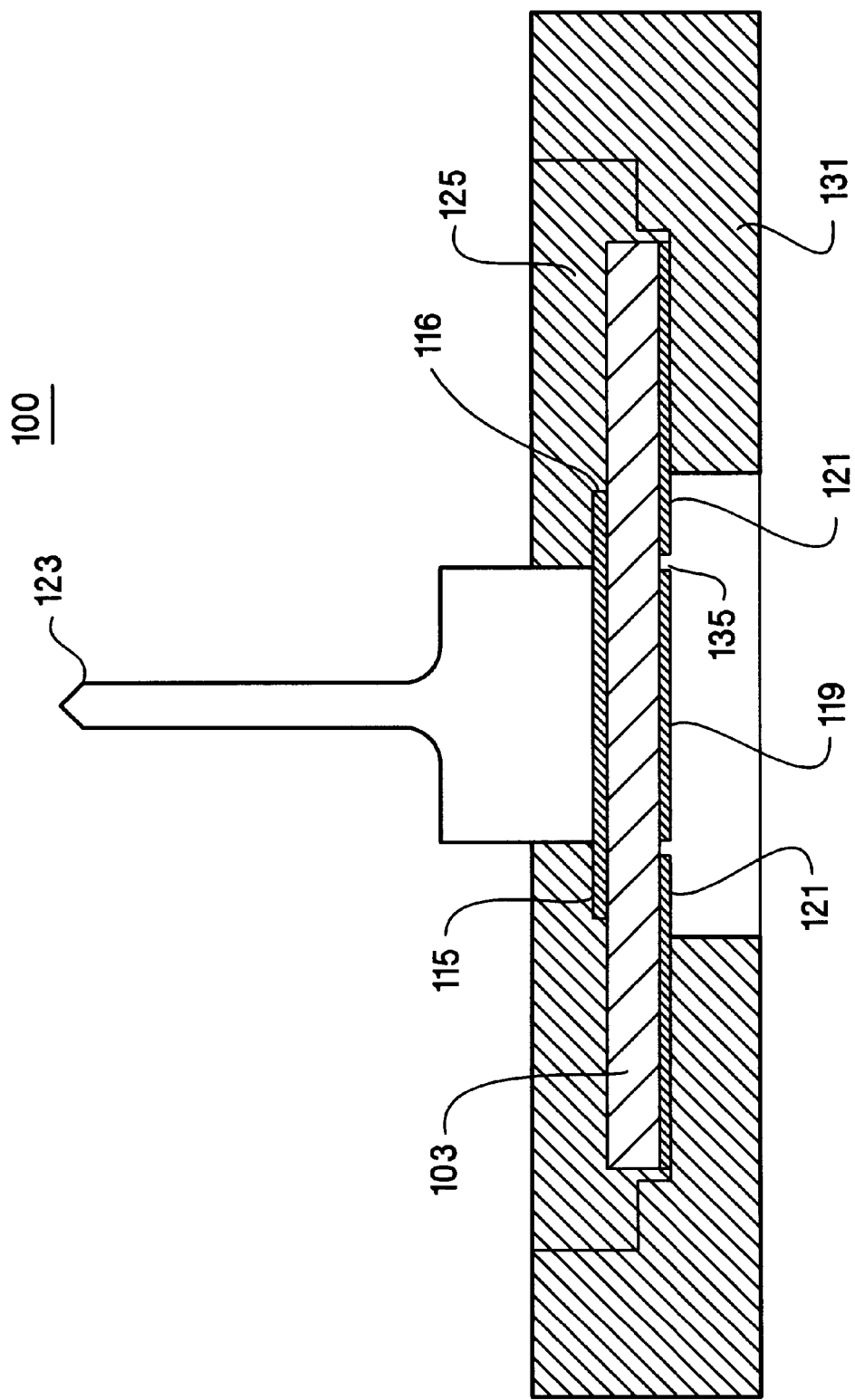
FIG. 1 is a cross-sectional view of a prior art sampling capacitor with a planar electrode.
Figure 2:
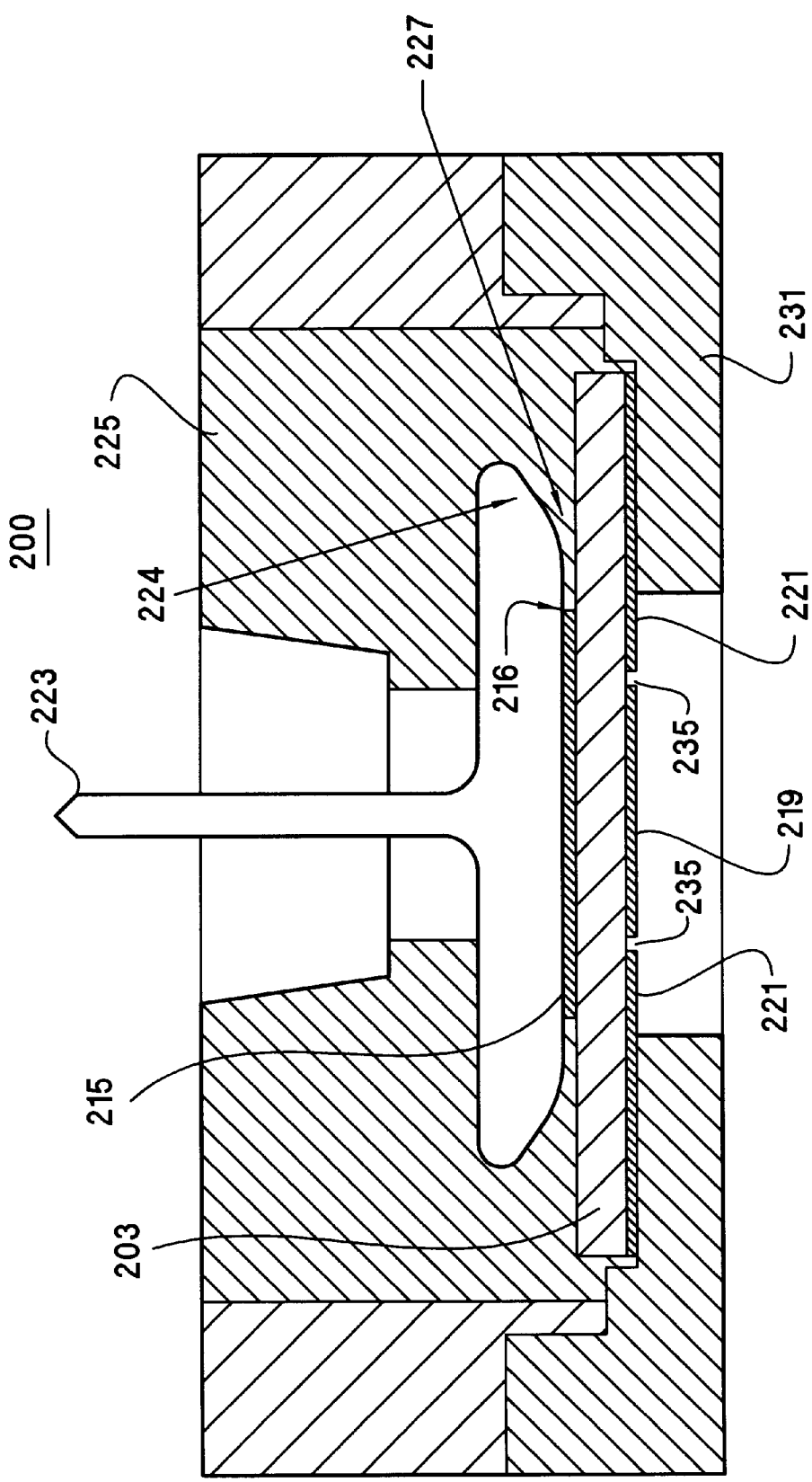
FIG. 2 is a cross-sectional view of a prior art sampling capacitor having a half-dome button.
Figure 3:
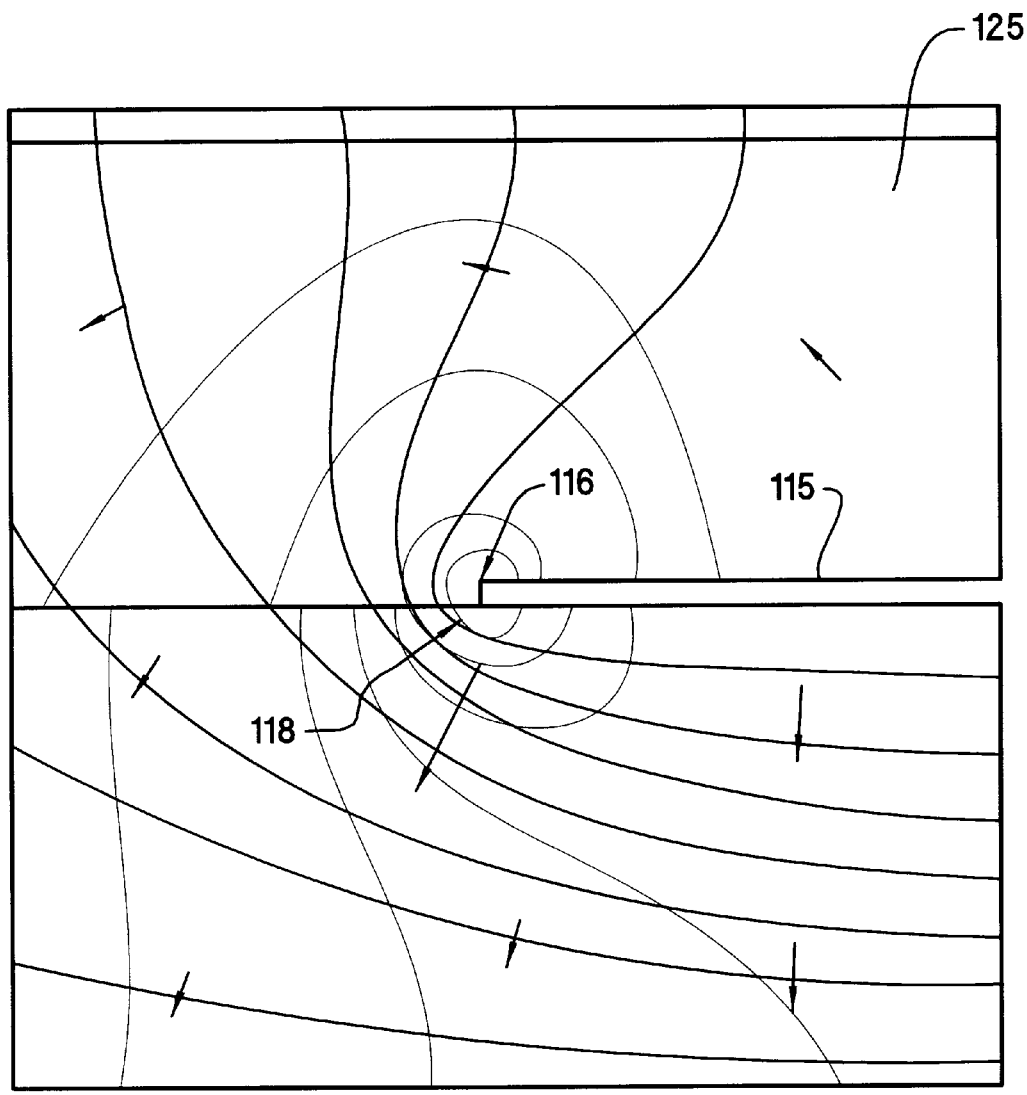
FIG. 3 is an iso-potential diagram of electric fields at an edge of a planar electrode of a prior art sampling capacitor.

In the following detailed description and in the several figures of the drawings, like elements are identified with like reference numbers.

As shown in the drawings for purposes of illustration, the invention is embodied in an apparatus having a dielectric material with a crater in a first surface of the dielectric. The crater has a liftoff curve between a bottom surface of the crater and a sidewall surface of the crater. An electrically conductive material is deposited in the crater to form an input electrode that conforms to the bottom surface, the liftoff curve, and the sidewall surface of the crater. On a second surface of the dielectric an electrically conductive material is applied to the second surface in opposing relation to the input electrode forming an output electrode. A sampling capacitor is defined between the input and the output electrodes. An additional electrically conductive material is applied to the second surface and is positioned concentrically outward of the output electrode to define a guard electrode. A guard capacitor is defined between the input and the guard electrodes. The guard electrode completely encircles the output electrode. A non-conductive gap separates the output electrode from the guard electrode. The crater-style capacitor of the present invention provides a consistent sampling capacitor, can be operated at high-voltages, exhibits negligible self-heating that can alter the value of the sampling capacitor, is adaptable to a variety of high-voltage and radio-frequency applications, eliminates corona discharge that can destroy the capacitor, and can be scaled to fit specific applications requiring an accurate sampling capacitor.

Figure 4:
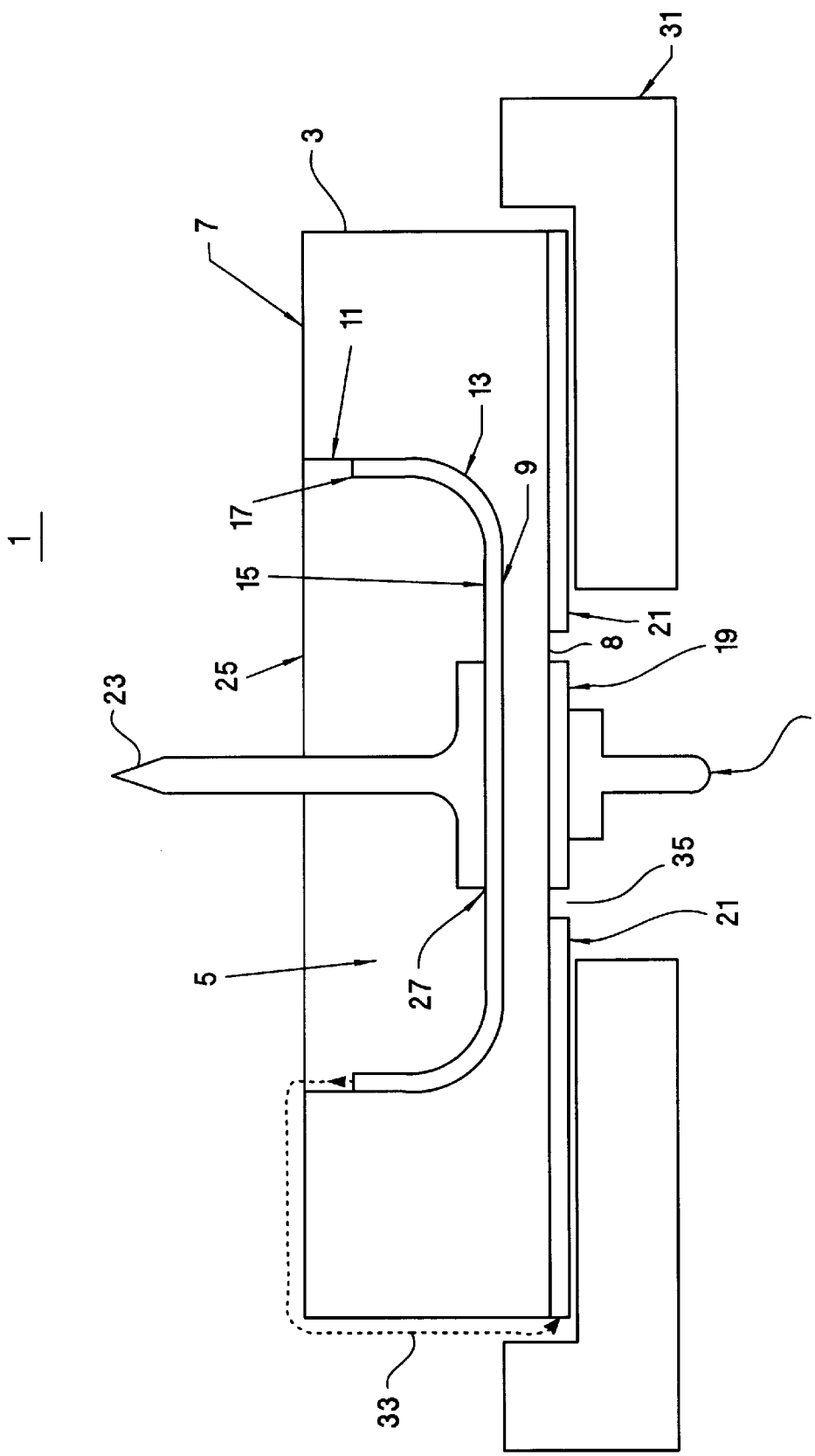
FIG. 4 is a cross-sectional view of a crater-style capacitor according to the present invention.

Referring to FIG. 4, there is provided in accordance with the present invention an apparatus generally designated as 1. The apparatus 1 includes a dielectric material 3 having a crater 5 in a first surface 7 of the dielectric 3. The crater 5 has a bottom surface 9 connected to a sidewall surface 11 by a liftoff curve 13. The sidewall surface 11 extends from the liftoff curve to the first surface 7 of the dielectric 3. The sidewall surface 11 need not be perpendicular to the first surface, for example, the sidewall surface could be a curve or a slope. In general, the crater 5 must not have sharp or oblique edges between the bottom and the liftoff curve or the liftoff curve and the sidewall. The crater 5 can be a spherical shape or a continuously curved surface.

The dielectric 3 can be in any shape, such as a rectangle, a circle, or a square, for example. Suitable materials for the dielectric 3 include, for example, quartz, ceramic, glass ceramic, and zero temperature coefficient glass. The material selected for the dielectric 3, for example quartz, must have a consistent dielectric constant and a consistent temperature coefficient from lot to lot. Further, the consistent dielectric constant and temperature coefficient allows a system incorporating the apparatus 1 to compensate for system stability. However, materials other than quartz, for dielectric 3, may be selected for apparatus 1 based on desired material properties and the intended application.

An input electrode 15 is disposed conformally in the crater 5. The input electrode 15 can be formed using a variety of methods such as painting, spraying, or a deposition, for example. It is important that the input electrode 15 have a smooth surface that is free of voids, bubbles, pinholes, or the like to prevent breakdown of the input electrode 15 at high-voltages. Additionally, it is essential that the input electrode 15 conform to the bottom surface 9, the liftoff curve 13, and the sidewall surface 11 of the crater 5. An upper edge electrode 17 of the input electrode 15 is positioned on the sidewall surface 11, but does not extend to the first surface 7 of the dielectric 3.

An output electrode 19 is disposed on a second surface 8 of the dielectric 3. The output electrode 19 is positioned in opposing relation to the input electrode 15. A sampling capacitor is defined between the input electrode 15 and the output electrode 19. A guard electrode 21 is disposed on the second surface 8 and completely encircles the output electrode 19. A non-conductive gap 35 separates the guard electrode 21 from the output electrode 19. A guard capacitor is defined between the input electrode 15 and the guard electrode 21.

The guard capacitor maintains parallelism of electric field lines in the sampling capacitor. Fringe electric fields at the perimeter of the apparatus 1 can be altered by electric fields external to the apparatus 1, for example, high-voltage wires in the vicinity of the apparatus 1. The guard capacitor prevents those external fields from distorting the parallelism of the electric field lines in the sampling capacitor, particularly, between the output electrode 19 and the input electrode 15. The guard capacitor shields the sampling capacitor from the external fields, thereby increasing the precision and accuracy of the apparatus 1.

Figure 8:
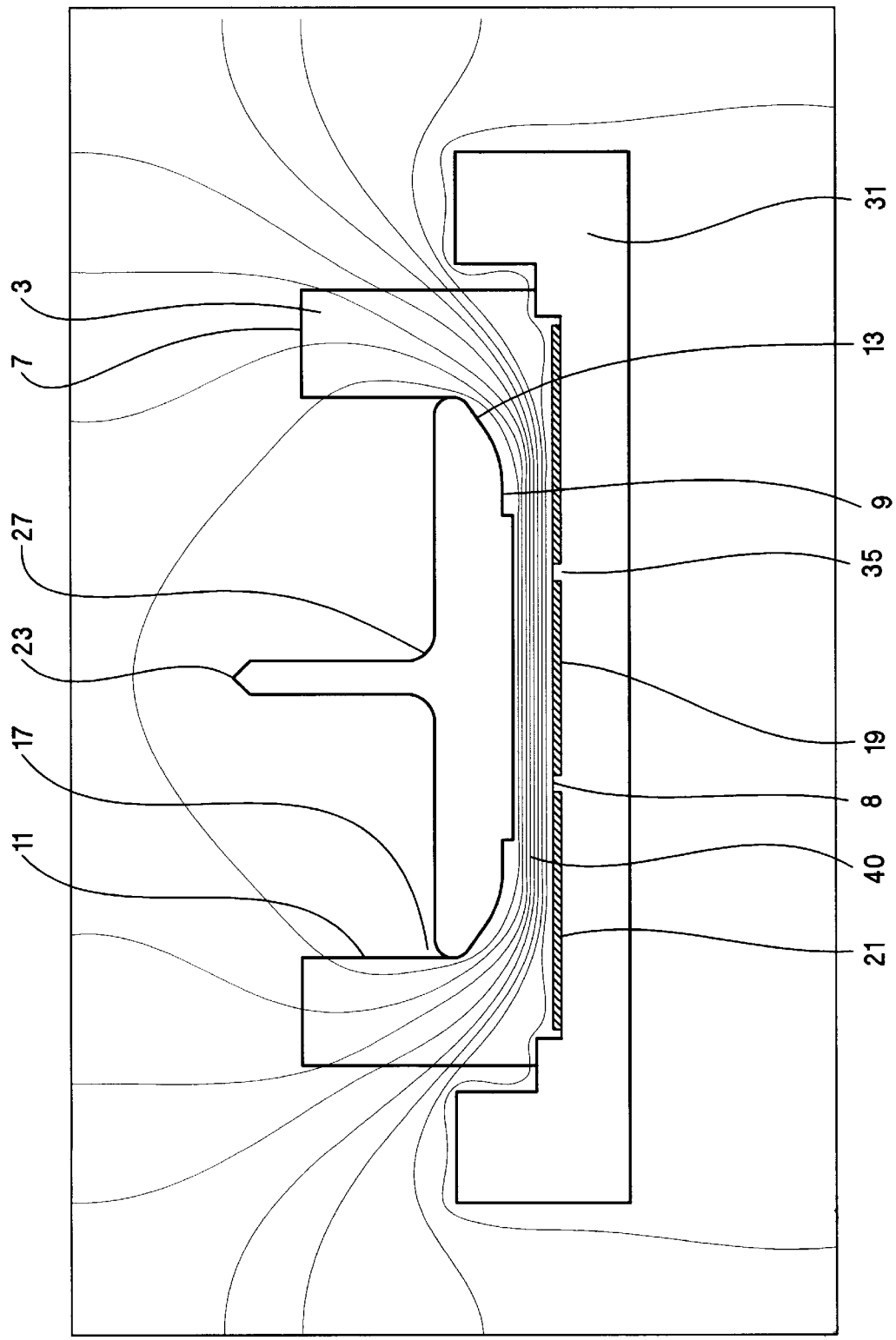
FIG. 8 is a diagram of iso-potential fields produced by a crater-style capacitor according to the present invention.

FIG. 8 illustrates the effect of the guard capacitor on iso-potential field lines 40 of the sampling capacitor. The iso-potential field lines 40 are substantially parallel in the region between the input electrode 15, the output electrode 19, and the guard electrode 21. Additionally, the output electrode 19, and the guard electrode 21 are at substantially the same potential to prevent distortion of the iso-potential field lines in the region between the input electrode 15, the output electrode 19, and the guard electrode 21.

Another feature of the present invention, as illustrated in FIG. 4, is the prevention of surface flashover at high-voltages. The surface flashover voltage is the voltage at which an arc discharge occurs between the input electrode 15 and the guard electrode 21 or between the input electrode 15 and any other ground. A creep path 33 defined by a distance along a path starting at the upper electrode edge 17, traveling along the sidewall surface 11, continuing along the first surface 7 and down a side of the dielectric 3, and terminating at the guard electrode 21. The longer the creep path 33, the higher the surface flashover voltage is. The surface flashover voltage can be increased by increasing the distance between the upper electrode edge 17 and the first surface 7. Additionally, the dimensions of the dielectric 3 can be altered to increase the surface flashover voltage.

In another embodiment of the present invention, an input terminal 23 may be connected to the input electrode 15. The input terminal 23 may be a wire or a pin, for example. An electrically conductive paste, solder, welding, or the like may be used to connect the input terminal 23 to the input electrode 15. An interface 27 is defined by the connection of the input terminal 23 to the input electrode 15. Additionally, an output terminal 29 may be connected to the output electrode 19. Optionally, compression spring contacts may be used to establish an electrical connection with the output electrode 19.

In another embodiment of the present invention, an encapsulant 25 is disposed in the crater 5 and completely covers the input electrode 15. The crater 5 may be filled all the way to the first surface 7 with the encapsulant 25. If the encapsulant 25 is used in conjunction with the input terminal 23, the interface 27 should be free of voids or interstices so that no air is entrained. A silicone elastomer or other similar material may be used for the encapsulant 25.

Figure 5:
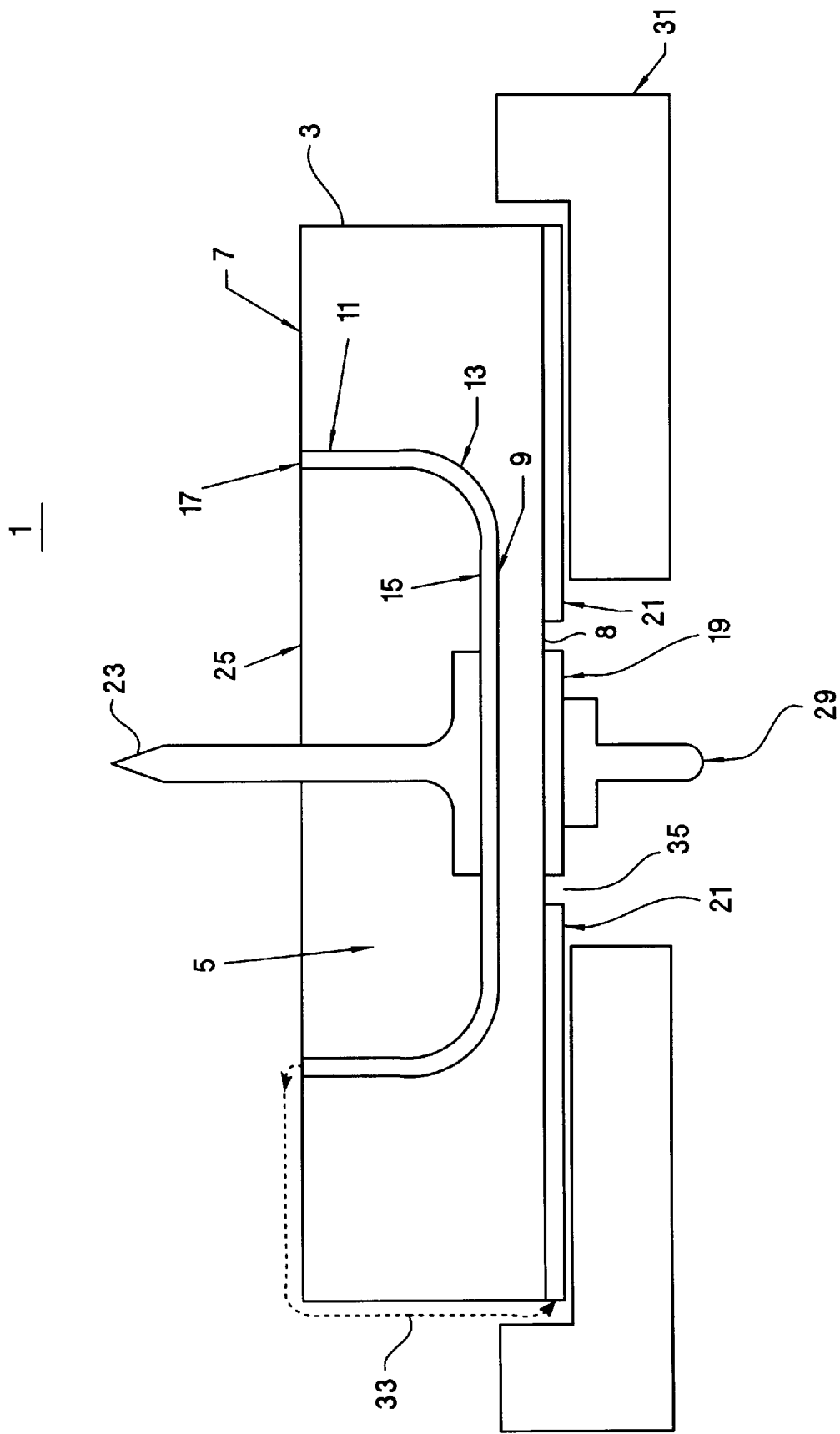
FIG. 5 is a cross-sectional view of an alternative embodiment of a crater-style capacitor according to the present invention.

In another embodiment of the invention, as illustrated in FIG. 5, the upper electrode edge 17 of the input electrode 15 extends to the first surface 7 of the dielectric 3. The creep path 33 is shorter because the creep path 33 starts at the first surface 7, therefore, foregoing the extra distance provided by the sidewall surface 11.

Figure 9:
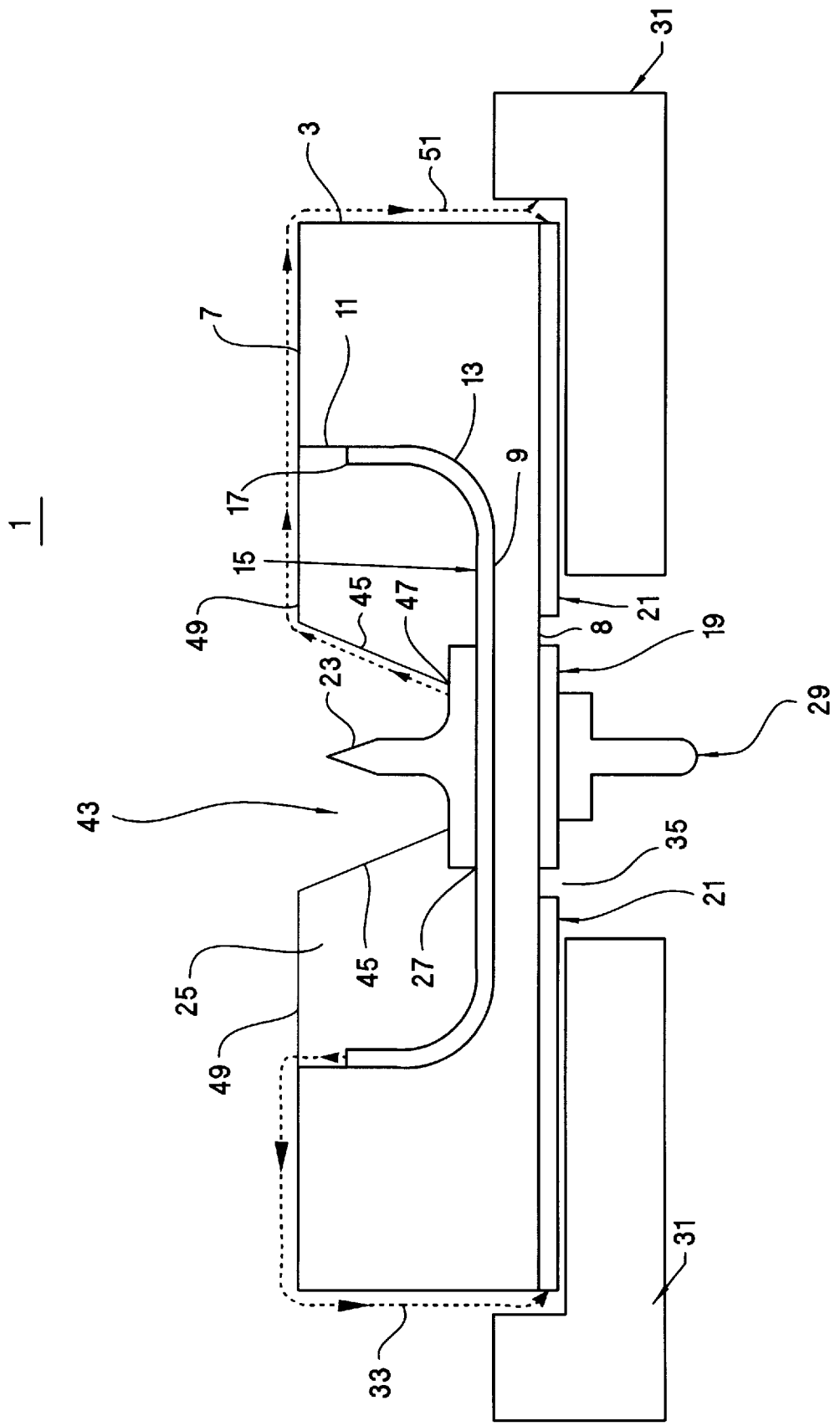
FIG. 9 is a cross-sectional view of another embodiment of a crater-style capacitor according to the present invention.

In another embodiment of the invention, as illustrated in FIG. 9, the encapsulant 25 does not completely fill the crater 5. An encapsulant opening 43 is disposed around input terminal 23 and defines an opening surface 45 positioned in opposing relation to the input terminal 23. A secondary creep path 51 is defined by distance along a path starting at an encapsulant interface 47 with the input terminal 23, traveling along the opening surface 45 onto an upper surface 49 of the encapsulant 25, continuing along the first surface 7 and down a side of the dielectric 3, and terminating at the guard electrode 21. Additionally, the base 31 may be in electrical communication with the guard electrode 21. The base 31 may be held at substantially ground potential so that the secondary creep path 51 terminates at the base 31. The secondary creep path 51 is longer than the creep path 33 thereby increasing the surface flashover voltage due to the extra path length provided by the opening surface 45 and the upper surface 49 of the encapsulant 25. Additionally, the input terminal 23 may be recessed into the encapsulant opening 43. Electrical connection to the input terminal 23 may be made with a compression spring contact, a wire, or the like.

In a preferred embodiment of a method according to the present invention, the apparatus 1 is made by: grinding a crater 5 into a first surface 7 of a dielectric 3, the crater 5 having a bottom surface 9, a sidewall surface 11, and a smooth liftoff curve 13 connecting the bottom surface 9 to the sidewall surface 11; depositing an electrically conductive material on the bottom surface 9, the liftoff curve 13, and a portion of the sidewall surface 11 to define an input electrode 15 having an upper electrode edge 17 on the sidewall surface 11; depositing a first electrically conductive material on a second surface 8 of the dielectric 3 to form an output electrode 19 defining a sampling capacitor between the input electrode 15 and the output electrode 19; depositing a second electrically conductive material on a second surface 8 of the dielectric 3 to form an guard electrode 21 defining a guard capacitor between the input electrode 15 and the guard electrode 21; heating the dielectric 3 to bake on the input electrode 15, the output electrode 19, and the guard electrode 21.

In another embodiment of a method according to the present invention, the upper electrode edge 17 is deposited on the sidewall surface at a position intermediate between the liftoff curve 13 and the first surface 7.

In an another embodiment of a method according to the present invention, the upper electrode edge 17 is deposited on the sidewall surface at a position adjacent to the first surface 7.

The input electrode 15, the output electrode 19, and the guard electrode 21 can be deposited in a variety of ways, for example, by vapor deposition, spraying, painting, silkscreening, or the like. Additionally, the material for the input electrode 15, the output electrode 19, and the guard electrode 21 may include an electrically conductive paint, an electrically conductive paste, or the like. The input electrode 15 may be deposited such that the entire sidewall surface 11 is covered by the input electrode 15 and the input electrode 15 extends to the first surface 7. The crater 5 may be created by milling, etching, drilling, boring, or other suitable method.

In another embodiment of a method according to the present invention, includes the steps of: attaching an electrically conductive input terminal 23 to the input electrode 15; attaching an electrically conductive output terminal 29 to the output electrode 19; filling the crater 5 with an electrically non-conductive encapsulant 25; and optionally, heating the apparatus 1 to cure the encapsulant 25.

Figure 6:
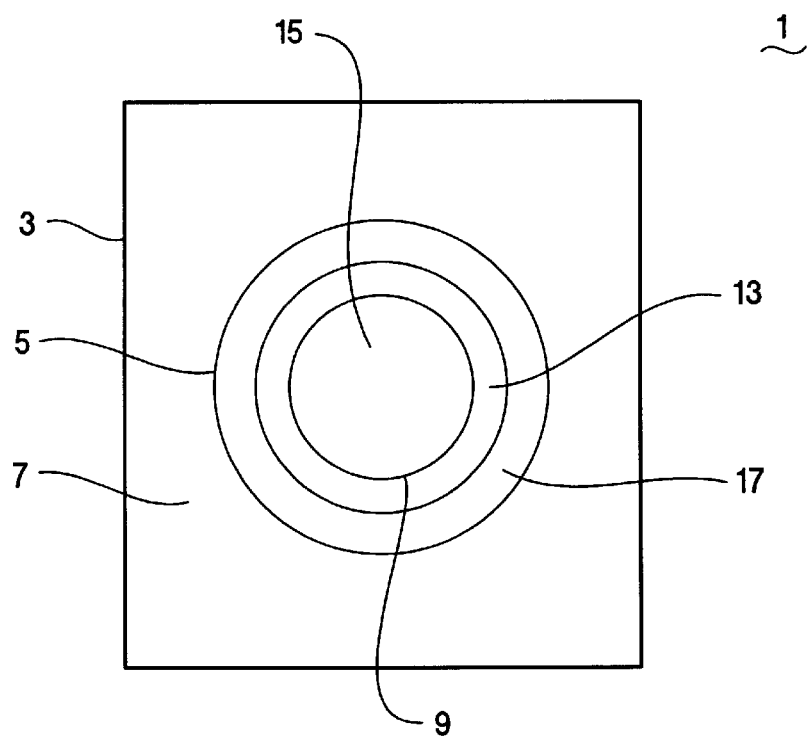
FIG. 6 is a input plan view of a crater-style capacitor according to the present invention.

The best mode for making the apparatus 1, as illustrated in FIG. 6, is to use a slab of quartz glass for the dielectric 3. The slab should be approximately 0.25 inches thick. A 1.0 inch square piece of quartz is cut from the slab to form the apparatus 1. A diamond cutting tool is used to grind the crater 5 into the first surface 7 of the dielectric 3. The bottom surface 9, the liftoff curve 13, and the sidewall surface 11 of the crater 5 should be smooth. The input electrode 15 is created by spraying a metalized paint in the crater 5. The paint coats the crater 5 entirely; however, the coating does not extend all the way to the first surface 7 so that the upper electrode edge 17 is positioned on the sidewall surface 11 intermediate between the liftoff curve 13 and the first surface 7. The input electrode 15 should be smooth and free of voids or pinholes.

Figure 7:
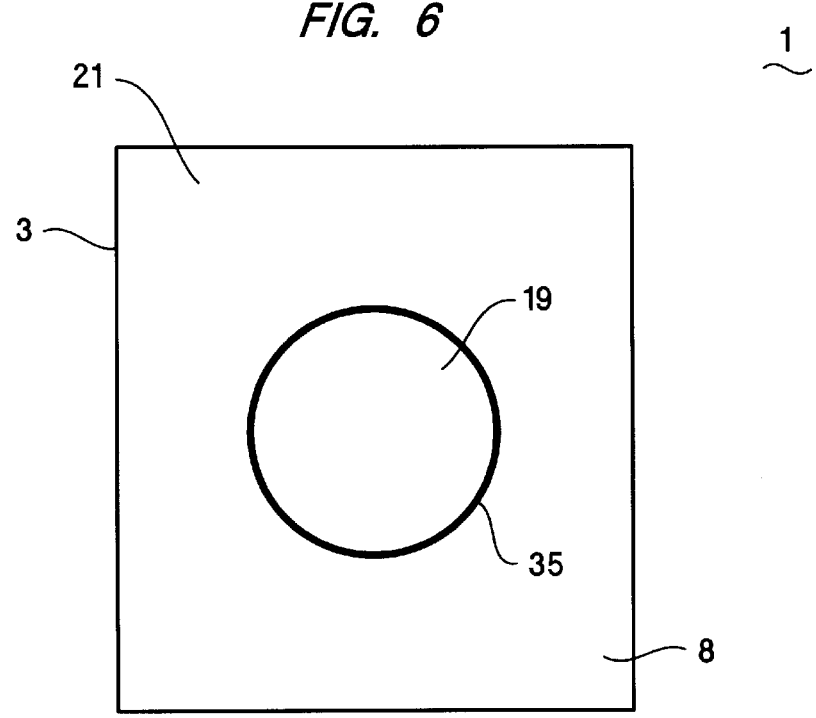
FIG. 7 is a output and guard plan view of a crater-style capacitor according to the present invention.

The output electrode 19 and the guard electrode 21 are applied to the second surface of the dielectric 3 by silk-screening a metalized paint onto the second surface 8. The output electrode 19 and the guard electrode 21 should be smooth and free of voids or pinholes. The non-conductive gap 35 separates the output electrode 19 from the guard electrode 21, as illustrated in FIG. 7. The apparatus 1 is then fired in a furnace to bake on the metalized paint that forms the electrodes.

The input terminal 23 can be a wire, preferably a pin with a broad base to allow connection to the input electrode 15 with a conductive paste. The interface 27 should be free of voids to prevent air from being entrained between the encapsulant 25, the input terminal 23 and the input electrode 15. The input terminal 23 can extend above the first surface 7 to allow for electrical interconnection. The output terminal 29 may be connected to the output electrode 19 in a manner similar to the input terminal 23 or by using compression spring contacts.

The crater 5 is filled with the encapsulant 25. The encapsulant 25 may be a silicone elastomer, preferably polydimethylsiloxane or Dow Corning SYLGARD™ 184 silicone elastomer. The encapsulant 25 should completely cover the upper electrode edge 17 of the input electrode 15, preferably the encapsulant 25 completely fills the crater 5 all the way to the first surface 7. The apparatus 1 is then heated to cure the encapsulant 25.

Although several embodiments of the present invention have been disclosed and illustrated, the invention is not limited to the specific forms or arrangements of parts so described and illustrated. The invention is only limited by the claims.

What is claimed is:

1. A high-voltage capacitor, comprising:
    a dielectric with a crater in a first surface, the crater having bottom and sidewall surfaces and sloped to form a smooth liftoff curve between the bottom and the sidewall surfaces;
    an input electrode disposed in the crater, the input electrode conformally covering the entire bottom surface, the entire liftoff curve, and a portion of the sidewall surface, the input electrode defining an upper electrode edge on the sidewall surface;
    an output electrode disposed on a second surface of the dielectric opposite the first surface and defining a sampling capacitor between the input electrode and the output electrode; and
    a guard electrode disposed on the second surface of the dielectric, the guard electrode encircling the output electrode and defining a guard capacitor between the input electrode and the guard electrode.

2. The capacitor of claim 1, wherein the input electrode is sized to define the upper electrode edge at a location on the sidewall surface intermediate between the liftoff curve and the first surface.

3. The capacitor of claim 1, wherein the input electrode is sized to define the upper electrode edge at a location on the sidewall surface adjacent to the first surface.

4. The capacitor of claim 1, wherein the dielectric is selected from the group consisting of quartz, glass ceramic, and zero temperature coefficient glass.

5. The capacitor of claim 1, further comprising an electrically conductive output terminal in electrical communication with the output electrode.

6. The capacitor of claim 1, further comprising an input terminal in electrical communication with the input electrode.

7. The capacitor of claim 6, wherein the crater is filled with an electrically non-conductive encapsulant.

8. The capacitor of claim 7, wherein the encapsulant is a silicone elastomer.

9. The capacitor of claim 8, wherein the elastomer is polydimethylsiloxane.

* * * * *